United States Patent
Blank et al.

(10) Patent No.: US 8,734,752 B2
(45) Date of Patent: May 27, 2014

(54) METHOD OF SYNTHESIS OF A FULLERIDE OF METAL NANO-CLUSTER AND MATERIAL COMPRISING A FULLERIDE OF METAL NANO-CLUSTER

(75) Inventors: Vladimir Davidovich Blank, Moscow (RU); Gennadii Ivanovich Pivovarov, Moscow (RU); Mikhail Yurievich Popov, Moscow (RU)

(73) Assignee: Siemens Aktiengesellschaft, München (DE)

( * ) Notice: Subject to any disclaimer, the term of this patent is extended or adjusted under 35 U.S.C. 154(b) by 467 days.

(21) Appl. No.: 12/947,057

(22) Filed: Nov. 16, 2010

(65) Prior Publication Data

US 2011/0114880 A1 May 19, 2011

(30) Foreign Application Priority Data

Nov. 17, 2009 (EP) ..................................... 09014376

(51) Int. Cl.
*C01B 31/00* (2006.01)

(52) U.S. Cl.
USPC ........ 423/445 B; 252/502; 252/506; 252/508; 252/62.51 R; 423/439; 977/734; 977/735; 977/810

(58) Field of Classification Search
USPC ..................... 252/188.1, 500–518.1, 62.51 R; 423/644, 439, 445 B; 977/734, 735, 977/810
See application file for complete search history.

(56) References Cited

U.S. PATENT DOCUMENTS

| | | | |
|---|---|---|---|
| 5,196,396 A * | 3/1993 | Lieber | 505/460 |
| 5,223,479 A | 6/1993 | Coustel | |
| 5,294,600 A | 3/1994 | Ebbesen | |
| 5,324,495 A * | 6/1994 | Gorun | 423/439 |
| 5,348,936 A | 9/1994 | Coustel | |
| 5,391,323 A | 2/1995 | Haddon | |
| 5,698,497 A | 12/1997 | Haddon | |
| 5,702,542 A * | 12/1997 | Brown et al. | 148/406 |
| 5,759,725 A * | 6/1998 | Hirao et al. | 430/58.1 |
| 6,245,312 B1 | 6/2001 | Blank et al. | |
| 6,726,892 B1 * | 4/2004 | Au | 423/644 |
| 7,531,273 B2 * | 5/2009 | Wagner et al. | 429/231.8 |
| 2005/0019576 A1 * | 1/2005 | Dahl et al. | 428/408 |
| 2005/0186104 A1 * | 8/2005 | Kear et al. | 419/11 |
| 2007/0003749 A1 * | 1/2007 | Asgari | 428/304.4 |
| 2007/0148080 A1 * | 6/2007 | Lueking et al. | 423/446 |
| 2010/0075226 A1 * | 3/2010 | Pham et al. | 429/219 |

FOREIGN PATENT DOCUMENTS

| | | |
|---|---|---|
| EP | 1199281 A1 | 4/2002 |
| JP | 05279194 A | 10/1993 |
| WO | WO 9311067 A1 | 6/1993 |
| WO | WO 0066813 A1 | 11/2000 |
| WO | WO2008097723 A1 * | 8/2008 .............. H01M 4/62 |

OTHER PUBLICATIONS

Liu et al. ("Mechanical milling of fullerene with carbide forming elements." J Mater Sc, 37, pp. 1229-1235, 2002).*

(Continued)

*Primary Examiner* — Tri V Nguyen

(57) ABSTRACT

A method of synthesis of a fulleride of metal nano-cluster is provided. The method is characterized in mechanically alloying metal nano-clusters with fullerene-type clusters. Fullerene molecules in the fulleride of metal nano-cluster are preserved. The alloying is done by milling in a planetary mill. A material including a fulleride of a metal nano-cluster is also provided.

10 Claims, 1 Drawing Sheet

(56) References Cited

OTHER PUBLICATIONS

Schilz et al. ("Synthesis of thermoelectric materials by mechanical alloying in planetary ball mills." Powder Tech, 105, pp. 149-154, 1999).*

Suryanarayana ("Mechanical alloying and milling." Progress in Mater Sc, 46, pp. 1-184, 2001).*

Wang ("Mechanical alloying and milling." Encycl of Nanosc and Nanotech, vol. X, pp. 1-9, 2003).*

Umemoto et al. ("Ball Milling of Fullerene and Mechanical Alloying of Fullerene-Metal Systems." Mater Sc Forum, vols. 312-314, pp. 93-102, 1999).*

Z. G. Liu, K. Tsuchiya, M. Umemoto: "Mechanical milling of fullerene with carbide forming elements", Journal of Materials Science, 2002; vol. 37, No. 6, pp. 1229-1235, XP002581390.

V.N. Denisov et al.; "Optics and Spectroscopy"; 1994; vol. 76, No. 2, pp. 242-253.

P. Rudolf et al.; "Report of Brookhaven National Laboratory"; Contract No. DE-AC02-98CH10886, Department of Energy, 2000.

T. Tokunaga et al; "Scripta Materialia 58"; 2008; pp. 735-738.

M. Umemoto et al; "Material Science Forum"; 1999; vols. 312-314; pp. 93-102.

M. Popov et al; Carbon nanocluster-based super-hard materials. 2002.

V. Blank et al; New Diamond and Frontier Carbon Technology; 2002; Journal vol. 12, No. 4; pp. 229-260.

Ed. E. Osawa; Perspectives of Fullerene Nanotechnology; Kluwer Academic Publishers; Dordrecht/Boston/London, 2002, pp. 223-233.

L.A. Chernozatonskii et al.; Chem. Phys. Let. 316 (2000), 199.

* cited by examiner

METHOD OF SYNTHESIS OF A FULLERIDE OF METAL NANO-CLUSTER AND MATERIAL COMPRISING A FULLERIDE OF METAL NANO-CLUSTER

CROSS REFERENCE TO RELATED APPLICATIONS

This application claims priority of European Patent Office application No. 09014376.9 EP filed Nov. 17, 2009, which is incorporated by reference herein in its entirety.

FIELD OF INVENTION

The present invention relates to a method of synthesis of a fulleride of metal nano-cluster and to a material comprising a fulleride of metal nano-cluster.

BACKGROUND OF INVENTION

Nanostructuring of materials increases strength and hardness by the effect of blocking of dislocation motion (or dislocation multiplication). For example, the effect takes place when the size of nano-crystal of polycrystalline material is about 10-60 nm for metals. In addition, nanostructuring changes transport and optical properties. This effect is usually used for semiconductors. For example, phonon-blocking/electron-transmitting effect of nanostructured materials is used to increase figure of merit of thermoelectric materials. One of typical synthesis procedures of nanostructured materials is sintering of bulk materials from preliminary synthesized starting nano-blocks. The nano-blocks themselves can be nanocomposite material.

Up to now, improvements of mechanical, transport and optical properties of materials by means of nanostructuring were considered as separate problems. Meanwhile, principally new constructional material, e.g. for external layer for superconductive cables, can be created if properties of nano-structured metal with increased strength and hardness (dislocation blocking effect) will be combined with the possibility of design and modification of transport and optical properties in one universal nano-block. Properties of the starting nano-blocks determine properties of bulk material if the nano-blocks are not destroyed during sintering.

For industrial applications the following requirements are important. The production of the nano-blocks must be effective from technological point of view, especially mass production should be possible. The nano-blocks must be suitable for sintering of bulk materials. The procedure of monitoring and control of the nano-blocks during synthesis must be fast and simple.

By definition, $C_{60}$ ball-shaped (as well as extended balls $C_{70}$, $C_{80}$, or $C_{36}$, etc.) molecules are called fullerene. In addition to the term "fullerene" the terms "fullerite" and "fulleride" are used. Derivatives of fullerene, e.g. polymerized fullerene molecules bonded by covalent bonds, are called fullerites. Chemical compositions of fullerene/fullerite with other chemical elements, clusters, etc. are called fullerides, e.g. metal fulleride.

Electronic structure modification of fullerenes by metals (metal fulleride) is proposed in U.S. Pat. No. 5,391,323, U.S. Pat. No. 5,196,396 and U.S. Pat. No. 5,698,497. The modification increases electrical conductivity of fulleride-based material. In EP 1 199 281 A1, U.S. Pat. No. 5,294,600, U.S. Pat. No. 5,324,495, U.S. Pat. No. 5,223,479 and U.S. Pat. No. 5,348,936 methods of making metal fulleride were proposed. Base idea of these methods is to produce metal fulleride by an ion exchange reaction in a liquid media. After synthesis, the metal fulleride is $Me_n(C_x)_m$ wherein $C_x$ is a fullerene anion, preferably $C_{60}$ or $C_{70}$, and Me is a metal cation. n and m are determined by the valences of fullerene and metal. n typically does not exceed 10 for m=1 (see U.S. Pat. No. 5,348,936).

In U.S. Pat. No. 5,223,479 superconducting, metal-doped fullerenes are provided, along with processes for their preparation in relatively high stoichiometric purity. In one embodiment, the processes provide fullerenes of the formula $M_3C_{60}$ where M is an alkali metal. The processes comprise contacting $C_{60}$ with alkali metal in an amount and under reaction conditions effective to produce a compound having the formula $M_yC_{60}$, where y is greater than 3, and contacting said $M_yC_{60}$ with a portion of $C_{60}$ in an amount and under reaction conditions effective to produce said $M_3C_{60}$.

In U.S. Pat. No. 5,348,936 also superconducting, metal-doped fullerenes are provided. In one embodiment, the processes provide fullerenes of the formula $M_xC_q$, where M is a metal, x is greater than 0 but less than about 10, and q is at least 60.

In U.S. Pat. No. 5,196,396 a method for making a superconductor fullerene composition is described, which includes reacting a fullerene with an alloy, and particularly reacting $C_{60}$ with a binary alloy including an alkali metal or a tertiary alloy including two alkali metals in the vapour phase.

In U.S. Pat. No. 5,324,495 a process for making metal fulleride compositions having the formula $A_n(C_x)_m$, wherein A is a metal cation and $C_x$ is a fullerene anion is provided. Preferably $C_x$ is $C_{60}$ or $C_{70}$. n is a number equal to the absolute value of the valence of the fullerene anion. m is equal to the absolute value of the valence A. The values of n and m are divided by their greatest common factor, if any, and the metal fulleride composition is neutral in charge. This process comprises reacting a metal with a fullerene in a solvent or mixture of solvents in which the fullerene is at least partly soluble at a temperature from greater than the freezing point to equal or less than the boiling point of the solvent, for a time sufficient to form the metal fulleride composition.

Effective control, especially by use of Raman scattering, of Me-fullerene interaction have been reported in V. N. Denisov et al. Optics and Spectroscopy, Vol. 76. No. 2, pp. 242-253 (1994). Raman spectra show low-frequency shifts of 5 cm$^{-1}$ per electron transferred from metal to fullerene at least for bands of 1424, 1468 and 1574 cm$^{-1}$. Analogous shift has been observed for IR spectra of metal fulleride in P. Rudolf, et al. Report of Brookhaven National Laboratory, contract number DE-AC02-98CH10886, Department of Energy, 2000.

The metal fulleride materials, which are considered above, have restricted technological applications. For example, the metal fulleride, which is described above, is a weak molecular crystal. For creation of material with enhanced mechanical properties, high pressure, preferably above 8 GPa, and high temperature, preferably above 900° C., are required as described in U.S. Pat. No. 6,245,312.

Synthesis of aluminium-fullerene composite fabricated by high pressure torsion has been reported in T. Tokunaga et al. Scripta Materialia 58 (2008) 735-738. The starting material in this publication is mixture of 75 μm powder of aluminium with 5 wt. % of fullerene. The high pressure torsion was performed with a pressure of 2.5 GPa. High pressure torsion is a well-known procedure for nanostructuring of metals. According to the publication, adding fullerene to starting aluminium powder with a graining of 75 μm leads to decreasing crystalline size of aluminium after treatment to 80 nm in comparison with 500 nm without fullerene. No data about bonding aluminium-fullerene or modification of transport properties of aluminium have been reported.

Mechanical alloying of Me and fullerene $C_{60}$ or $C_{70}$ in a ball mill has also been reported in M. Umemoto et al. Material Science Forum, Vols 312-314, pp. 93-102 (1999). According to this publication, "molecular structure of $C_{60}$ ($C_{70}$) is lost when metal was Cu, Fe, Ni or Sn". In the case of Al, the remaining fraction of $C_{60}$ is about 1% of the initial quantity.

SUMMARY OF INVENTION

Therefore, it is a first objective of the present invention to provide a method of synthesis of a fulleride of metal nano-cluster. It is a second objective of the present invention to provide a material comprising a fulleride.

The first objective is solved by a method as claimed in the claims. The second objective is solved by a material as claimed in the claims. The depending claims define further developments of the invention.

The inventive method of synthesis of a fulleride of metal nano-cluster is characterized in mechanically alloying metal nano-clusters with fullerene-type clusters. The fullerene molecules in the fulleride of metal nano-cluster are preserved. The fulleride of metal nano-cluster, which is produced by means of the inventive method, can be used as universal nano-block as mentioned above.

Preferably the metal nano-clusters are mechanically alloyed with fullerene-type clusters by milling in a planetary mill. Advantageously a nano-powder of metal nano-clusters of a size between 5 nm and 60 nm, especially between 10 nm and 30 nm, is used. Furthermore, the fullerenes $C_{60}$, $C_{70}$, $C_{80}$ or $C_{36}$ ball-shaped molecules can be used. Moreover, aluminium-lithium alloy nano-clusters, for example conventional aluminium-lithium alloy 1430, can be used.

Advantageously, a powder of metal nano-clusters can be prepared in combination with mechanically alloying the powder of metal nano-clusters with fullerene-type clusters in the planetary mill.

For example, steel milling balls having a weight between 250 g and 270 g, preferably 260 g, can be used. Steel milling balls having a diameter between 6 mm and 8 mm, preferably 7 mm, may be used in the planetary mill. Furthermore, the mechanically alloying may be performed in an atmosphere comprising argon and hydrogen.

Metal nano-clusters and fullerene-type clusters in granules of a size between 0.5 mm and 0.6 mm may be used. Metal nano-clusters and fullerene-type clusters of a total weight between 5 g and 15 g may be used. Moreover, metal nano-clusters and fullerene-type clusters comprising between 95 wt. % and 99 wt. % metal nano-clusters and between 5 wt. % and 1 wt. % fullerene can be used. Preferably the used starting material comprises 97 wt. % metal nano-clusters and 3 wt. % fullerene.

The milling balls may be accelerated between 800 m/s$^2$ and 1200 m/s$^2$, preferably 1000 m/s$^2$. The metal nano-clusters may be milled between 80 min and 120 min, preferably 100 min. In a next step the metal nano-clusters may be milled with fullerene between 10 min and 30 min, preferably 20 min. Alternatively, the metal nano-clusters may be milled together with fullerene for between 80 min and 140 min, preferably 120 min.

The bond of metal nano-clusters with fullerene may be covalent, ionic or partially covalent and partially ionic. Electrons are transferred from the metal nano-crystal to fullerene, thus providing conditions for modifications of transport and optical properties of both metal and fullerene. The number of transferred electrons is a controllable value during the synthesis. The effect of blocking of dislocation is provided by the size of metal nano-crystal and the effect is enhanced by presence of the fullerene clusters bonded to the surface of the metal cluster.

Generally, the mechanically alloying activates creation of new bonds between metal and fullerenes. The key feature of the synthesis of fulleride of metal nano-clusters is the preservation of fullerene molecules and the avoidance of molecules destruction. The synthesis procedure permits optimization of the material properties, for example the number of electrons transferred from the metal nano-crystal to fullerene and the degree of chemical bonding of fullerene with metal cluster, by the variation of time of compounds treatment in the planetary mill and the starting fullerene concentration.

The fulleride of metal nano-cluster may be sintered. Advantageously, fullerene molecules in the fulleride of metal nano-cluster are preserved during the sintering process. The fulleride of metal nano-cluster may be sintered by high pressure torsion. The high pressure torsion may be performed at room temperature. Moreover, the pressure may have a value between 10 GPa and 12 GPa, preferably 11 GPa.

Powder metallurgy technique is typically used for production of articles, especially products, components or pieces, from the synthesized fulleride of metal nano-cluster. The key feature of the sintering, for example sintering by powder metallurgy technique, is preservation of fullerene molecules and avoidance of molecules destruction in fulleride of metal nano-cluster. The effect of preventing of fullerene destruction during sintering can be achieved by optimization of heating time and temperature of heating. The sintering procedure permits optimization of the material properties, for example the number of electrons transferred from metal nanocrystal to fullerene and degree of chemical bonding of fullerene with metal cluster. The optimization of the material properties can be achieved by variation of parameters of powder metallurgy technique, especially of isostatic pressure, high pressure torsion, heating time, temperature of heating, etc.

Raman spectra of the synthesized material can be used for control of the fullerene state in both the synthesized fulleride of metal nano-cluster and articles sintered from the fulleride of metal nano-cluster. Raman spectra can be used to control parameters such as preservation of fullerene, number of electrons transferred from the metal nanocrystal to fullerene or degree of chemical bonding of fullerene with metal cluster. Raman spectroscopy is not the unique procedure for the control. Alternative procedures could be IR, XPS and others.

The inventive material comprises a fulleride of metal nano-cluster. The inventive material may be produced by means of the inventive method, as described above.

The chemical bond of the metal nano-cluster with the fullerene may be covalent, ionic or partially covalent and partially ionic. Moreover, the material may comprise metal nano-clusters of a size between 5 nm and 60 nm, preferably between 10 nm and 30 nm.

The inventive material may be expressed as $Me_n(C_x)_m$ wherein $C_x$ is a fullerene and Me is a metal and $n \geq 10$ for $m=1$. The metal may comprise aluminium-lithium alloy, for example conventional aluminium-lithium alloy 1430. The fullerene may comprise $C_{60}$, $C_{70}$, $C_{80}$ or $C_{36}$ ball-shaped molecules.

Advantages of the present invention are the following. The synthesized universal nano-block composes from metal nano-cluster which is chemically bonded with fullerene, thus creating fulleride of metal nano-cluster. The universal nano-block combines improvement of mechanical properties with possibility of design and modification of transport and optical properties. Properties of the starting nano-blocks determine properties of bulk material if the nano-blocks are not destroyed during sintering. Effect of blocking of dislocation motion is provided by the size of metal nanocluster and the effect is most likely enhanced by presence of the fullerene bonded to the surface of the metal cluster. Electrons are transferred from the metal nanocrystal to fullerene, thus providing conditions for modification of transport and optical properties of both metal and fullerene. The number of the transferred electrons is controllable value during synthesis and subsequent sintering. The key feature of the synthesis of the universal nano-block, which comprises the fulleride of metal nano-cluster, is preservation of fullerene and avoidance of molecules destruction. Articles, for example products, components or pieces, can be sintered from the universal nano-block, which comprises the fulleride of metal nano-cluster. The key feature of the sintering process of articles (products, components, pieces) from the synthesized fulleride of metal nano-cluster is preservation of fullerene and avoidance of molecules destruction in the universal nano-block which comprises the fulleride of metal nano-cluster.

BRIEF DESCRIPTION OF THE DRAWINGS

Further features, properties and advantages of the present invention will become clear from the following description of embodiments in conjunction with the accompanying drawings. The described features are advantageous alone and in combination with each other.

DETAILED DESCRIPTION OF INVENTION

Figure 1:
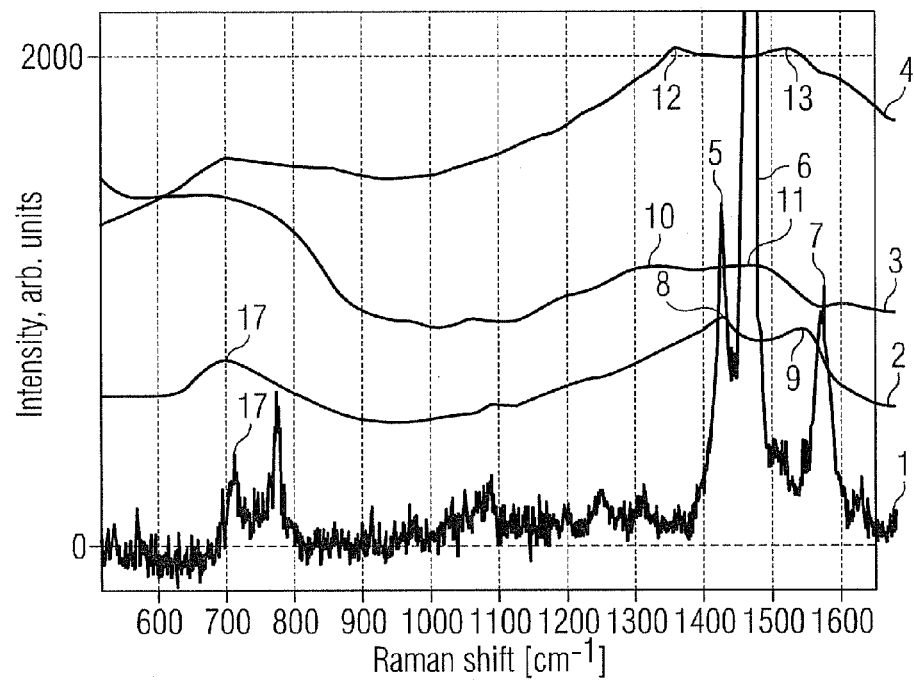
FIG. 1 shows Raman spectra of initial fullerene $C_{60}$, of fulleride of aluminium-lithium nano-cluster synthesize by milling for 20 min, fulleride of aluminium-lithium nano-cluster synthesized by milling for 120 min and sintered fulleride of aluminium-lithium nano-cluster.

A first embodiment of the present invention will now be described with reference to FIG. 1.

Conventional aluminium-lithium alloy 1430 and fullerene $C_{60}$ of 99.99% of purity were loaded in a container of a planetary mill. The loading was performed in glove box in Ar (99.999% of purity) and 3% of $H_2$ (99.9999% of purity) atmosphere. The glove-box is equipped with a sluice or lock. The sluice was expulsed by Ar and $H_2$ during the operation. The diameter of steel balls of the planetary mill was about 7.12 mm. The weight of balls was 259 g. The total weight of the loaded material was 10 g including 9.7 g of conventional aluminium-lithium alloy 1430 and 0.3 g of $C_{60}$ (3 wt. %). The starting materials were in granules of a size of about 0.5 mm. The acceleration of the milling balls was 1000 m/c$^2$.

The following two example procedures of the treatment were used. In a first example first the aluminium-lithium alloy 1430 was milled 100 min. Next, the fullerene $C_{60}$ was added and the aluminium-lithium alloy 1430 with the fullerene $C_{60}$ was milled 20 min. In a second example the aluminium-lithium alloy 1430 with the fullerene $C_{60}$ was milled 120 min.

The material after alloying is fulleride of aluminium-lithium nano-cluster with a mean size of 20 nm in both examples. The number of electrons transferred from the metal nanocrystal to the fullerene and the degree of chemical bonding of the fullerene with the metal cluster are different for the two examples.

The fulleride of aluminium-lithium nano-cluster was analyzed by x-ray and transmission electron microscope (TEM). The aluminium-lithium nano-clusters in the alloy were nanocrystals. The mean size of a fulleride of aluminium-lithium nano-cluster was 20 nm.

According to x-ray diffraction data, $Al_4C_3$ was not created after the treatment. Only the bands corresponding to the starting aluminium-lithium are present in the diffraction pattern. The mean crystalline size, D, was determined from powder x-ray diffraction (XRD) spectra by Selyakov-Scherrer method (A. Guinier. X-Ray Diffraction—In Crystals, Imperfect Crystals, and Amorphous Bodies, Dover Publication, New York (1963)). Data obtained by Selyakov-Scherrer method were verified by the more complex Hall-Williamson method (G. K. Williamson and W. H Hall. Acta Metallurgica 1, 1953, 22-31). In this method data for all the peaks are plotted in coordinates FWHM cos $\theta/\lambda$ against sin $\theta/\lambda$. Extrapolation of the mean-square line to the ordinate axis gives value 1/D. TEM was used for verification of results obtained using x-ray procedure.

Raman spectra were used to control such parameters as preservation of fullerene, number of electrons transferred from the metal nanocrystal to fullerene and degree of chemical bonding of fullerene with metal cluster. Raman spectra of initial fullerene $C_{60}$, fulleride of aluminium-lithium nano-cluster synthesized in the first example, fulleride of aluminium-lithium nano-cluster synthesized in the second example and sintered fulleride of aluminium-lithium nano-cluster, which will be explained below, are plotted in FIG. 1.

FIG. 1 shows Raman spectra of initial fullerene $C_{60}$ 1, of fulleride of aluminium-lithium nano-cluster synthesize by milling for 20 min 2, fulleride of aluminium-lithium nano-cluster synthesized by milling for 120 min 3 and sintered fulleride of aluminium-lithium nano-cluster 4.

The x-axis of the Raman spectra shows the Raman shift given in cm$^{-1}$. The y-axis of the Raman spectra shows the intensity in arbitrary units. The Raman spectrum of initial fullerene $C_{60}$ 1 shows a broad band around 700 cm$^{-1}$ 17 and bands at 1424 cm$^{-1}$ 5, at 1468 cm$^{-1}$ 6 and 1574 cm$^{-1}$ 7. The Raman spectrum of the fulleride of aluminium-lithium nano-cluster synthesized as described in the first example 2 shows a broad band around 700 cm$^{-1}$ 17 and Raman bands at 1425 cm$^{-1}$ 8 and 1540 cm$^{-1}$ 9. Polymerized fulleride with a bcc crystal structure shows Raman bands at 1450 cm$^{-1}$ and 1560 cm$^{-1}$ (not shown in FIG. 1).

Compared with the Raman bands of polymerized fulleride the Raman bands of fulleride of aluminium-lithium nano-cluster synthesized as described in the first example 2 show a low-frequency shift of −25 cm$^{-1}$ for the Raman band at 1450 cm$^{-1}$ and a low-frequency shift of −20 cm$^{-1}$ for the Raman band at 1560 cm$^{-1}$. Compared with the Raman bands of polymerized fulleride a Raman band of fulleride of aluminium-lithium nano-cluster synthesized as described in the second example 3 shows a Raman band at 1330 cm$^{-1}$ 10 and a Raman band at 1470 cm$^{-1}$ 11. This corresponds to low-frequency shifts of −120 cm$^{-1}$ regarding the Raman band at 1450 cm$^{-1}$ and a low-frequency shift of −90 cm$^{-1}$ regarding the Raman band at 1560 cm$^{-1}$.

Furthermore, FIG. 1 shows a Raman spectrum 4 of a sintered fulleride of aluminium-lithium nano-cluster, which was sintered by high pressure torsion from fulleride of aluminium-lithium nano-cluster synthesized as described in the first example. The details of a sintering process will be described in the second embodiment. The Raman spectrum 4 shows Raman bands at 1360 cm$^{-1}$ 12 and 1520 cm$^{-1}$ 13. These Raman bands correspond to low-frequency shifts compared with the Raman bands of polymerized fulleride at 1450 cm$^{-1}$ and 1560 cm$^{-1}$ of −90 cm$^{-1}$ and −40 cm$^{-1}$, respectively.

According to well-developed procedure of interpretation of Raman spectra of fullerene/fullerites, fullerene was not destroyed during synthesis. Characteristic features of fullerene/fullerites are a broad band around 700 cm$^{-1}$ 17 along with bandwidth increasing and bands overlapping for high-frequency tangential modes in Raman spectra.

Details of the procedure of interpretation of Raman spectra of fullerites are published in M. Popov, Y. Koga, S. Fujiwara, B. Mavrin, V. D. Blank, Carbon nanocluster-based superhard materials. New Diamond and Frontier Carbon Technology Journal Vol. 12 (2002), No. 4, pp 229-260; V. Blank, S. Buga, G. Dubitsky, N. Serebryanaya, M. Popov and V. Prokhorov. Perspectives of Fullerene Nanotechnology. Ed. E. Osawa, Kluwer Academic Publishers, Dordrecht/Boston/London, 2002, pp. 223-233; L. A. Chernozatonskii, N. R. Serebryanaya, B. N. Mavrin, Chem. Phys. Let. 316 (2000), 199. All the mentioned above features of Raman spectra indicate presence of strong chemical bonds perturbing fullerene molecules.

The number of electrons transferred from the aluminium-lithium nano crystal to fullerene can be estimated from low-frequency shift (at least for the bands of 1424, 1468 and 1574 cm$^{-1}$) of 5 cm$^{-1}$ per electron transferred from metal to fullerene (V. N. Denisov et al. Optics and Spectroscopy, Vol. 76, No. 2, pp. 242-253 (1994); P. Rudolf, et al. Report of Brookhaven National Laboratory, contract number DE-AC02-98CH10886, Department of Energy, 2000). For more correct estimation of the transferred electrons, comparison of the shifted Raman bands of fulleride of aluminium-lithium nano-cluster with the bcc phase of polymerized fullerite (M. Popov et al. New Diamond and Frontier Carbon Technology Journal Vol. 12 (2002), No. 4, pp 229-260) instead of starting fullerene was done. The estimation is given in Table 1.

TABLE 1

High-frequency tangential fullerenes modes for bcc polymerized and fulleride of aluminium-lithium nano-cluster

| Material | Raman bands/ bandwidth, cm$^{-1}$ | | Low-frequency shift, cm$^{-1}$ | | Transferred electrons |
|---|---|---|---|---|---|
| Initial C$_{60}$ | 1424-1468 | 1574 | | | — |
| bcc polymerized fullerite | 1450 | 1560 | | | — |
| Al—Li nano-cluster, example (1), 20 min. | 1425/123 | 1540/93 | 25 | 20 | 4-5 |
| Al—Li nano-cluster, example (2), 120 min. | 1330/277 | 1470/166 | 120 | 90 | 18-24 |
| Sintered fulleride of Al—Li nano-cluster in example (3) | 1360/176 | 1520/275 | 90 | 40 | 8-18 |

In summary, bandwidth indicates the degree of chemical bonding of fullerene. The low-frequency shift indicates the number of the transferred electrons. These two facts indicate that fullerene is bonded to aluminium-lithium nanocrystal. In addition, there is a correlation (see Table 1) between the bandwidth as indicator of degree of chemical bonding and the number of transferred electrons.

A second embodiment of the present invention will now be described with reference to FIGS. 1 and 2. Regarding the description of FIG. 1 it is referred to the first embodiment.

In a first example of the present embodiment a disk was sintered by high pressure torsion with a pressure of 11 GPa at room temperature from fulleride of aluminium-lithium nano-cluster. The used fulleride of aluminium-lithium nano-cluster was synthesized by 100 min milling of aluminium-lithium alloy 1430 and subsequent addition of C$_{60}$ and 20 min milling of the alloy with C$_{60}$ as described in the first example of the first embodiment.

According to the mentioned above procedure of interpretation of Raman spectra of fullerene/fullerites, fullerene was not destroyed during synthesis. A Raman spectrum of the sintered disc 4 is shown in FIG. 1. The sintered disk composes from fulleride of aluminium-lithium nano-cluster. Parameters like the number of the transferred electrons and the degree of chemical bonding of the fulleride of aluminium-lithium nano-cluster are listed in Table 1.

The hardness of the sintered disk is between 5 GPa and 7 GPa, while the starting aluminium-lithium alloy 1430 has a hardness of 0.8 GPa.

In a second example of the present embodiment a disk was sintered by hot isostatic pressing. In this operation, the disk is compressed at 0.2 kbar and sintered simultaneously by heating to 480° C. Time of heating was about 30 min, while it is known (see M. Popov et al. New Diamond and Frontier Carbon Technology Journal Vol. 12 (2002), No. 4, pp 229-260) that during synthesis of fullerite, heating time should not exceed 1 min. As a result of long time of heating, fullerene was destroyed.

Figure 2:
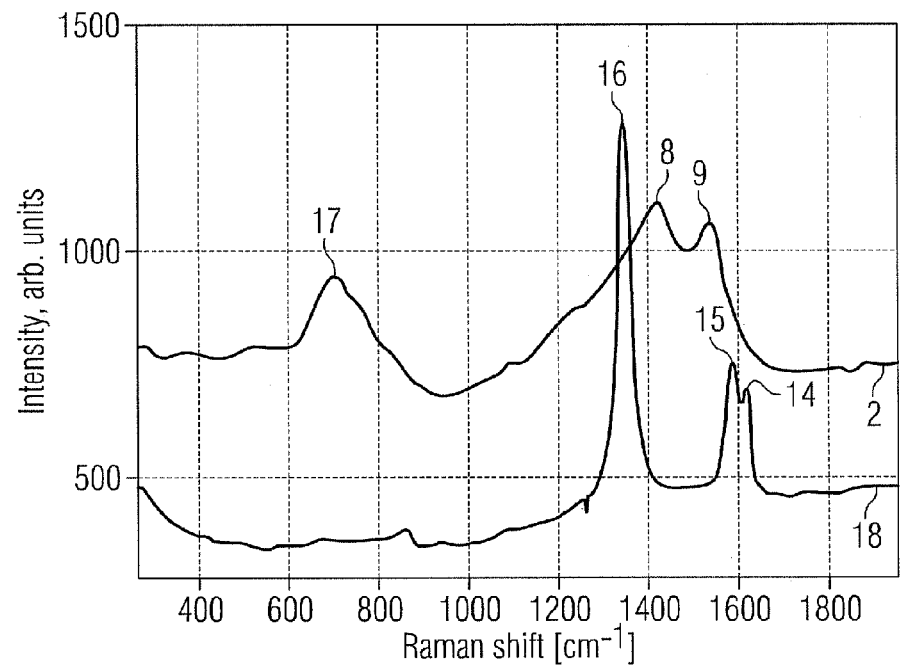
FIG. 2 shows a Raman spectrum of a product of collapsed fullerene and a Raman spectrum of fulleride of aluminium-lithium nano-cluster synthesized by milling for 20 min.

FIG. 2 shows a Raman spectrum of a product of collapsed fullerene 18 and a Raman spectrum of fulleride of aluminium-lithium nano-cluster 2 synthesized by milling for 20 min. The Raman spectrum 18 in FIG. 2 shows the product of collapsed fullerene, which is characterized by the absence of both 700 cm$^{-1}$ and tangential fullerene modes. In the Raman spectrum 18 there are a D mode of disordered graphite at 1350 cm$^{-1}$ 16, a G mode of grapheme-type structure at 1582 cm$^{-1}$ 15 along with a mode of phonon density of states of grapheme-type structures at 1620 cm$^{-1}$ 14. The Raman spectrum of fulleride of aluminium-lithium nano-cluster 2 synthesized by milling for 20 min in FIG. 2 is given for comparison.

The hardness of the sintered disk with collapsed fullerene is 2 GPa, while disk of the fulleride of aluminium-lithium nano-cluster has hardness between 5 GPa and 7 GPa.

The second embodiment indicates importance of preservation of metal nano-clusters during sintering as well as unique mechanical properties of this universal nano-block.

The invention claimed is:

1. A method of synthesis of a fulleride of metal nano-cluster, comprising:
   adding a nano-powder comprising metal nano-clusters having a size between 5 nm and 60 nm and fullerene-type clusters to a planetary mill, and
   mechanically alloying the metal nano-clusters with the fullerene-type clusters by milling in the planetary mill, wherein fullerene molecules in the fulleride of metal nano-clusters are preserved.

2. The method as claimed in claim 1, wherein the metal nano-clusters comprise aluminum-lithium alloy nano-clusters.

3. The method as claimed in claim 1, wherein the planetary mill comprises steel milling balls having a weight between 250 g and 270 g and/or steel milling balls having a diameter between 6 mm and 8 mm in the planetary mill.

4. The method as claimed in claim 1, wherein the mechanically alloying is done in an atmosphere comprising argon and hydrogen.

5. The method as claimed in claim 1, wherein metal nano-clusters and fullerene-type clusters comprise granules of a size between 0.5 mm and 0.6 mm.

6. The method as claimed in claim 1, wherein metal nano-clusters and fullerene-type clusters comprise between 95 wt. % and 99 wt. % metal nano-clusters and between 5 wt. % and 1 wt. % fullerene.

7. The method as claimed in claim 1, wherein the planetary mill comprises milling balls and accelerating the milling balls between 800 m/s$^2$ and 1200 m/s$^2$.

8. The method as claimed in claim 1, wherein the metal nano-clusters are milled between 80 min and 120 min and the metal nano-clusters are milled with fullerene between 10 min and 30 min.

9. The method as claimed in claim 1, wherein the metal nano-clusters are milled with the fullerene-type clusters for between 80 min and 140 min.

10. The method as claimed in claim 1, wherein the fulleride of metal nano-cluster is sintered.

\* \* \* \* \*